United States Patent Office
3,840,592
Patented Oct. 8, 1974

3,840,592
SEPARATION OF DIOXIN AND 2,4,5-T FROM DIOXIN AND 2,4,5-T-CONTAMINATED SILVEX
Albert Edwin Sidwell, Jacksonville, Ark., assignor to Hercules Incorporated, Wilmington, Del.
No Drawing. Filed Oct. 26, 1971, Ser. No. 192,299
Int. Cl. C07c 65/00
U.S. Cl. 260—521 H    3 Claims

ABSTRACT OF THE DISCLOSURE

Disclosed is a process for separating dioxin from dioxin-contaminated silvex. It comprises admixing, preferably in water or acetonitrile and water, the dioxin-contaminated silvex with certain amine material, whereby silvex is converted into an amine salt, and subjecting the resulting dioxin-contaminated silvex amine salt to fractional, liquid-liquid extraction with a polar liquid solvent consisting essentially of acetonitrile and water, and a nonpolar liquid solvent, the volumetric ratio of polar solvent to nonpolar solvent being selected so that more of the dioxin is dissolved by the nonpolar liquid solvent than by the polar liquid solvent, while more of the silvex amine salt is dissolved by the polar liquid solvent than by the nonpolar liquid solvent. In some embodiments, the polar liquid solution resulting from the extraction is then treated to recover silvex. In one such embodiment, for use when the silvex is also contaminated with 2,4,5-T, the treatment includes the removal of 2,4,5-T.

This invention is in the chemical arts. It has to do with that part of organic chemistry pertaining to phenoxy herbicides.

In one process for making the herbicide 2-(2,4,4-trichlorophenoxy)propionic acid, commonly known as silvex, the end product can contain a compound that under some circumstances is highly toxic. This compound, commonly called dioxin, is 2,3,7,8-tetrachlorodibenzo-p-dioxin. Its concentration in the end product can be as much as about 30 parts by weight per million parts by weight of silvex. In addition to the toxicity of dioxin, there is some evidence this contaminant may have teratogenic properties.

One problem to which this invention provides a solution is how to remove dioxin from dioxin-contaminated silvex.

Sometimes in the production of silvex the end product has a substantial concentration of 2,4,5-trichlorophenoxyacetic acid (2,4,5-T) which in some instances is not desired even though it too is a herbicide. This can happen when some of the same equipment employed to make 2,4,5-T or intermediates thereof is also used in the production of silvex.

Another problem to which a specific embodiment of this invention provides a solution is how also to remove 2,4,5-T from silvex contaminated not only with dioxin but also with 2,4,5-T.

In summary, this invention provides a process for the separation of dioxin from dioxin-contaminated silvex. This process comprises (1) admixing in an aqueous medium the dioxin-contaminated silvex with certain amine material, whereby dioxin-contaminated silvex is converted to dioxin-contaminated silvex amine salt, and (2) effecting fractional, liquid-liquid extraction of the dioxin-contaminated silvex amine salt with a polar liquid solvent consisting essentially of acetonitrile and water at a volumetric ratio of acetonitrile to water of about 1:1–19:1, and a nonpolar liquid solvent, the volumetric ratio of polar solvent to nonpolar solvent being selected so that more of the dioxin is dissolved by the nonpolar liquid solvent than by the polar liquid solvent, while more of the silvex amine salt is dissolved by the polar liquid solvent than by the nonpolar liquid solvent. The fractional, liquid-liquid extraction results in a polar solvent solution comprising silvex amine salt with a substantially reduced concentration of dioxin, and a nonpolar solvent solution immiscible with the polar solvent solution and poor or lean in silvex amine salt, but enriched in dioxin. Subsequently, in a number of embodiments of the process of this invention, the silvex amine salt portion of the polar liquid solution is treated to recover silvex, whereby silvex with a substantially reduced dioxin content is obtained.

The amine material reacted with the dioxin-contaminated silvex in the first step of the process of this invention is material selected from the group consisting of mono-, di- and tri($C_1$–$C_7$ alkanol)amines, and mono-, di- and tri($C_1$–$C_7$ alkyl) amines. Preferred compounds are diethanolamine and triethylamine.

The quantity of amine material admixed with the dioxin-contaminated silvex is that quantity at which a substantial portion of the silvex is converted into an amine salt soluble in the polar liquid solvent. Preferably the quantity of amine material is stoichiometric relative to the quantity of silvex. However, greater and smaller quantities are within the broader concepts of this invention.

The aqueous medium in which the mixing of the dioxin-contaminated silvex and amine material is carried out generally is water or preferably the polar liquid solvent employed in the fractional, liquid-liquid extraction step.

The quantity of aqueous medium in which the dioxin-contaminated silvex and the amine material are admixed is at least sufficient to dissolve the silvex amine salt that is formed.

Admixing of the amine material and dioxin-contaminated silvex generally is carried out at room temperature (20–25° C.) and at atmospheric pressure. However, higher and lower temperatures, and higher and lower ambient pressures are within the broader concepts of this invention. In this regard, admixing of the amine material with the dioxin-contaminated silvex may cause the temperature of the resulting reaction mixture to increase a few degrees because of the small amount of heat generated by the reaction of silvex, an acid, with the amine.

With regard to the extraction step of the process of this invention, the distinction between, and characteristics of, polar and nonpolar liquid solvents are well-known. In general, polar liquid solvents such as water, methanol, acetone, acetonitrile, and the like are characterized by hydroxyl groups or carbonyl groups associated with strong polarity, by high dielectric constants which are evidence of such polarity, and by water miscibility. In general, nonpolar liquid solvents such as benzene, hexane, carbon disulfide, isooctane, and the like, are characterized by weakly polar molecular structures and, accordingly, low dielectric constants. In general, nonpolar liquid solvents are water-immiscible. Indeed, a characteristic of polar and nonpolar liquid solvents is a general immiscibility of polar liquid solvents with nonpolar liquid solvents. Partial miscibility frequently does exist, depending upon how strongly polar or nonpolar the two solvents are. However, under the concepts of this invention, there must be sufficient immiscibility not only of the polar liquid solvent and non-polar liquid solvent, but also of the solutions formed after admixture of the solvents with the dioxin-contaminated silvex amine salt. Each solvent under the concepts of this invention can be a single liquid or a miscible mixture of liquids as long as the immiscibility of the polar liquid solvent and the nonpolar liquid solvent, and of the resulting polar solution and nonpolar solution exists. According to this invention the nonpolar liquid solvent must dissolve dioxin at least to a limited extent.

The solvent ratio, that is to say, the volumetric ratio of polar liquid solvent to nonpolar liquid solvent is selected so that upon admixture of the solvents with the dioxin-contaminated silvex amine salt, more of the dioxin is dissolved by the nonpolar solvent than by the polar solvent, while more of the silvex amine salt is dissolved by the polar solvent than by the nonpolar solvent. This condition is satisfied by a rather broad range of solvent ratios. It is dependent on a number of variables including the solvents, temperature, dioxin concentration, and the like.

However, the optimum solvent ratio can be approximated from the equation:

$$R = \sqrt{\frac{1}{C_s \times C_d}}$$

in which R is the solvent ratio (volumetric basis), $C_s$ is the distribution coefficient or partition ratio of silvex amine salt in the solvent system at the selected temperature of extraction, and $C_d$ is the distribution coefficient or partition ratio of dioxin in the solvent system at the selected temperature of extraction.

$C_s$ and $C_d$ are determined by application of the following equations:

$$C_s = \frac{S}{S'},$$

in which S stands for grams of silvex amine salt dissolved per 100 milliliters of polar liquid solution at the selected temperature of extraction, and S' stands for grams of silvex amine salt dissolved per 100 milliliters of nonpolar liquid solution at the selected temperature of extraction, and $$C_d = \frac{D}{D'},$$

in which D stands for micrograms of dioxin dissolved per 100 milliliters of polar liquid solution at the selected temperature of extraction, and D' stands for micrograms of dioxin dissolved per 100 milliliters of nonpolar liquid solution at the selected temperature of extraction.

The quantities of S and S' can be determined by mixing a 1 gram sample of pure silvex amine salt with 100 milliliters of each solvent to be employed, separating the resulting phases, measuring the volume of each phase, removing the solvents as by evaporation or distillation, weighing the silvex amine salt residues, and then calculating for each phase the weight of silvex amine salt per 100 milliliters of phase.

The quantities D and D' for the dioxin equation can be determined as follows. A 2.0 milliliter aliquot portion of a solution containing 102 micrograms of dioxin per milliliter of chloroform is transferred to a 17 milliliter screw cap vial. Chloroform is removed by careful evaporation. 5 milliliters of the polar liquid solvent and 5 milliliters of the nonpolar liquid solvent are added to the vial which is then sealed and vigorously shaken for 30 seconds. The contents of the vial are permitted to equilibrate at the selected temperature of extraction. An aliquot portion of the resulting nonpolar liquid solution is quantitatively analyzed by gas chromatography for dioxin. From the analysis the total quantity of dioxin in the nonpolar solution is calculated. The difference between this value and 204 micrograms (the total quantity of dioxin in the vial) is the quantity of dioxin in the polar liquid solution.

The fractional, liquid-liquid extraction step of the invention is preferably performed by admixing the solution of dioxin-contaminated silvex amine salt with acetonitrile (if not already present at the selected volumetric ratio of acetonitrile to water in the range of about 1:1 to about 19:1) and the nonpolar liquid solvent, whereby a two-phase mixture results, and then separating one phase from the other. The two-phase mixture ultimately obtained comprises an aqueous solution or raffinate fraction, and a nonpolar liquid solution or extract fraction. Under the concepts of this invention the two fractions are immiscible and do not form stable emulsions under the prevailing process conditions. Hence, after admixture has been completed, coalescence of the phase and phase separation take place. The phases are separated from one another as by decantation, centrifugation, or the like.

In the more specific and preferred aspects of this invention the fractional, liquid-liquid extraction step is performed by a countercurrent procedure as on a stage-wise basis [such as in the apparatus described by Scheibel in Ind. Eng. Chem., 49, 1679–1684, particularly 1681–1683 (1957)] or on a continuous basis in an extraction column such as one of those described in Chemical Engineers' Handbook, Perry, 3rd Ed., 747–753 (1950). A preferred extraction-type column apparatus for these steps is that described in "Technique Of Organic Chemistry," Vol. 3, Separation and Purification," second complete revised and augmented edition, Interscience Publishers Inc., 376–386 (particularly shown on page 377) (1956).

The number of extraction steps (theoretical or actual stages of admixing and separating) is selected to give an ultimate raffinate fraction as rich as practical in silvex amine salt, but with dioxin at or below a selected concentration. The number of extraction stages in general depends on the dioxin concentration of the dioxin-contaminated silvex amine salt, the volumetric ratio of the solvent pair, the degree of purity sought in the silvex product, the efficiency of the extraction system, the apparatus employed, and the like. Hence, for a given dioxin-contaminated silvex amine salt, a trial run of the extraction procedure usually should be done to determine optimum conditions for the extraction.

In one embodiment of the process of this invention the raffinate fraction is treated to recover silvex with a substantially reduced dioxin content by distillation of acetonitrile and any codissolved nonpolar liquid solvent therefrom, and then reacting the silvex amine salt with a mineral acid such as hydrochloric acid to convert the silvex salt to silvex.

In another embodiment of the process of this invention, which is practised when the dioxin-contaminated silvex also contains 2,4,5-T at an undesired concentration, the aqueous solution of silvex amine salt remaining after distillation of acetonitrile plus any codissolved nonpolar liquid solvent from the raffinate fraction is admixed with an alkali metal hydroxide such as, for example, sodium hydroxide, preferably in aqueous solution and preferably in quantity sufficient to not only react with the 2,4,5-T amine salt but also with the silvex amine salt to free the amine material for recovery as by further distillation. The resulting reaction mixture is established and maintained in a temperature range in which the alkali metal salt of 2,4,5-T is substantially insoluble and the alkali metal salt of silvex is substantially soluble. A satisfactory range of temperatures is 10–30° C., but higher and lower temperatures are within the broader concepts of this invention. As a result, the alkali metal salt of the 2,4,5-T precipitates from the solution. After separation of the precipitated alkali metal of 2,4,5-T and removal of amine material as by distillation, the solution of alkali metal salt of silvex is admixed with a mineral acid such as, for example, hydrochloric acid, to convert the salt to the free acid which precipitates, and the free acid is separated as by filtration, washing and drying.

In some embodiments of the process of this invention each of the steps is carried out on a batch basis. In other embodiments one or more of the steps is or are carried out on a continuous basis. In all embodiments of the process it is preferred to recover and recycle the amine material and solvents. Generally, the extract fraction is distilled to recover nonpolar liquid solvent substantially free of dioxin, and the dioxin loaded residue destroyed as by incineration.

The sodium salt of 2,4,5-T can be treated to recover 2,4,5-T, or destroyed.

The best mode now contemplated for carrying out this invention is illustrated by the following example of a specific embodiment of the invention. In the example all parts by weight are indicated by w, all parts by volume are indicated by v, and w is to v as the kilogram is to the liter.

EXAMPLE

This example illustrates a specific embodiment of the process of this invention in which the dioxin and 2,4,5-T contents of silvex contaminated therewith are substantially reduced.

Into a reactor equipped with a mixer are charged silvex (100 w) having a dioxin content of 1–5 parts by weight per million parts by weight of the silvex, and a 2,4,5-T content of 1 part by weight per hundred parts by weight of the silvex. Also introduced into the reactor is a polar liquid solvent (385 v) consisting essentially of acetonitrile and water at a volumetric ratio of acetonitrile to water of about 9:1. While the resulting mixture is stirred with the mixer, triethylamine (35.7 w) is added. The silvex and triethylamine rapidly react and the resulting silvex triethylamine salt rapidly dissolves. If there is any extraneous material which does not dissolve, it is separated as by filtration from the resulting silvex amine salt solution.

The dioxin and 2,4,5-T contaminated silvex amine salt solution is added to hexane 150 v.) in a separator equipped with a mixer, and the resulting mixture is vigorously agitated for about six minutes. Vigorous agitation of the mixture is stopped and maintained quiescent for ten minutes to permit the phases to coalesce and separate. The lower aqueous phase containing in solution silvex amine salt is drained from the separator into a second separator equipped with a mixer and containing hexane (150 v.). The resulting mixture is vigorously agitated for six minutes and then permitted to stand for ten minutes. The resulting lower layer is drained to a third separator equipped with a mixer and containing hexane (150 v.). The six minute vigorous agitation followed by ten minutes of standing are again repeated. The lower layer is removed from the third separator and introduced into a distillation pot containing distilled water (500 v.). The upper layers from each of the separators are combined, washed with 2 portions (10 v.) of water, and the washings added to the distillation pot.

The solution in the distillation pot is distilled. The first cut (about 35 v.) that collects typically has two liquid phases, an upper layer of hexane in equilibrium with a lower layer of water containing some hexane and a small amount of acetonitrile. This condensate is from a vapor having a temperature of 57–58° C. which rapidly rises to 76–77° C. at the end of the distillation cut. This temperature remains nearly constant until additional distillate (about 300 v.) is collected. The temperature of the condensing vapor then gradually risese to 99.7° C. while an additional quantity (about 135 v.) of distillate is collected. The hexane layer in the first cut is separated for recycle to subsequent extractions and the acetonitrile-water middle cut is stored for recycle. The final cut comprising some acetonitrile in a large portion of water is also retained for use as dilution water.

The solution remaining in the distillation pot, comprising 2,4,5-T contaminated silvex amine salt, is cooled to about 40° C. A 50% by weight aqueous solution (32 w.) of sodium hydroxide is added to the solution in the distillation pot, the contents of the pot are stirred, and distilled. The distillate comprises two liquid phases, an upper layer of watery triethylamine, and a lower layer of water containing some triethylamine. As soon as the distillate shows no evidence of phase separation, the triethylamine rich layer is separated from the main body of the watery layer. Distillation is continued until the vapor temperature reaches 99° C. at which temperature the distillate is then collected separately until no indication of amine is present upon testing. The triethylamine rich layer and the watery layers are retained for recycle. The contents of the distillation pot are cooled to room temperature (20–25° C.). A small amount of precipitate may form in the liquid. Filtration of the mixture as by a suction filter yields a clear solution. The filter cake remaining on the filter is washed with a small quantity (5 v.) of 0.1N NaOH solution. The washed filter cake consists essentially of the sodium salt of 2,4,5-T.

The clear filtrate and filter cake wash are combined and heated to 80–85° C. for stirring. The hot solution is admixed with sufficient hydrochloric acid to lower the pH of the resulting mixture to 1.4. This results in the formation of an oily second phase which rapidly crystallizes under continued stirring while the mixture is allowed to cool. When the temperature of the mixture has dropped to 28–30° C., the solids present are caught on a suction filter, washed with a 0.1 N aqueous solution (35 v.) of hydrochloric acid, and then with a small quantity of water. The washed solids are permitted to drain under suction until liquid fails to drip from the filter. The solids are then dried to constant weight at a temperature of 100–102° C.

The dioxin content of the thus purified silvex is less than 0.1 part by weight per million parts by weight of silvex. The 2,4,5-T content of the thus purified silvex is less than 0.25 part by weight per hundred parts by weight of silvex.

Thus, this invention provides a process for purifying silvex contaminated with dioxin. In addition, it provides a process for purifying silvex also contaminated with 2,4,5-T.

Other features, advantages and specific embodiments of this invention will become readily apparent to those exercising ordinary skill in the art after reading the foregoing disclosures. Such specific embodiments are within the scope of the claimed subject matter unless expressly indicated to the contrary by claim language. Moreover, while a specific embodiment of this invention has been described in considerable detail, variations and modifications of it can be effected without departing from the spirit and scope of the invention as disclosed and claimed.

The expression "consisting essentially of" as used in this specification excludes any recited substance at a concentration sufficient to substantially adversely affect the essential properties and characteristics of the composition of matter being defined, while permitting the presence of one or more unrecited substances at concentrations insufficient to substantially adversely affect said essential properties and characteristics.

I claim:

1. A process for separating dioxin and 2,4,5-T from dioxin and 2,4,5-T contaminated silvex amine salts selected from the group consisting of the mono-, di- and tri($C_1$–$C_7$ alkanol) and mono-, di- and tri($C_1$–$C_7$ alkyl) amine salts of silvex, which comprises effecting fractional, liquid-liquid extraction of said dioxin-contaminated silvex amine salt with a polar liquid solvent consisting essentially of acetonitrile and water at a volumetric ratio of acetonitrile to water of about 1:1–19:1, and a nonpolar liquid solvent, the volumetric ratio of polar liquid solvent to nonpolar liquid solvent being selected so that more silvex amine salt is dissolved by the polar liquid solvent than by the nonpolar liquid solvent while more dioxin is dissolved by the nonpolar liquid solvent than by the polar liquid solvent, whereby there are obtained an extract fraction with a substantial portion of the dioxin, and a raffinate fraction comprising silvex amine salt, treating the silvex amine salt portion of said raffinate fraction with alkali metal hydroxide, whereby alkali metal salts of 2,4,5-T and silvex are formed, and separating alkali metal salt of 2,4,5-T from the alkali metal salt of silvex.

2. A process according to claim 1 in which the alkali metal salt of silvex is treated with a mineral acid, whereby silvex with a substantially reduced content of dioxin and 2,4,5-T is obtained.

3. A process for separating dioxin and 2,4,5-T from silvex contaminated with 2,4,5-T and with dioxin up to about 30 parts by weight per million parts by weight of silvex, which comprises: reacting said dioxin-contaminated silvex with a stoichiometric quantity of amine material selected from the group consisting of mono-, di- and tri ($C_1$–$C_7$ alkanol)amines, and mono-, di- and tri ($C_1$–$C_7$ alkyl)amines, whereby dioxin and 2,4,5-T contaminated silvex amine salt is formed; effecting fractional, liquid-liquid extraction of said dioxin-contaminated silvex amine salt with a polar liquid solvent consisting essentially of acetonitrile and water at a volumetric ratio of acetonitrile to water of about 1:1–19:1, and a nonpolar liquid solvent, the volumetric ratio of polar liquid solvent to nonpolar liquid solvent being selected so that more silvex amine salt is dissolved by the polar liquid solvent than by the nonpolar liquid solvent while more dioxin is dissolved by the nonpolar liquid solvent than by the polar liquid solvent, whereby there are obtained an extract fraction with a substantial portion of the dioxin, and a raffinate fraction comprising 2,4,5-T contaminated silvex amine salt with a substantially reduced dioxin content; admixing in an aqueous medium said 2,4,5-T contaminated silvex amine salt with alkali metal hydroxide, whereby alkali metal salts of 2,4,5-T and silvex are formed, while establishing and maintaining the resulting mixture in the temperature range in which the alkali metal salt of 2,4,5-T is substantially insoluble in said aqueous medium and the alkali metal salt of silvex is substantially soluble in said aqueous medium, whereby alkali metal salt of 2,4,5-T is precipitated; separating precipitated alkali metal salt of 2,4,5-T from said resulting mixture; and admixing in an aqueous medium the silvex alkali metal salt portion of the remainder of said resulting mixture with a mineral acid, whereby silvex with substantially reduced contents of dioxin and 2,4,5-T is obtained.

References Cited
UNITED STATES PATENTS

| | | | |
|---|---|---|---|
| 2,588,336 | 3/1952 | Meyer | 260—521 R |
| 2,588,679 | 3/1952 | Williams et al. | 260—521 R |

FOREIGN PATENTS

| | | | |
|---|---|---|---|
| 250,154 | 1/1970 | U.S.S.R. | 260—521 A |
| 6500303 | 7/1966 | Netherlands. | |

OTHER REFERENCES

Perry et al., Chemical Engineering Handbook, McGraw-Hill Book Co. (1950) (14–40)–(14–42).

Kirk-Othmer, "Encyclopedia of Chemical Technology," vol. 8 (1965) pages 719–733.

Brewster et al., "Organic Chemistry," Prentice Hall, Inc. (1961) pages 218–219.

Markin, C.A., 69, 18183a.

Stanck et al., C.A. 72, 132320a.

LORRAINE A. WEINBERGER, Primary Examiner

J. F. TERAPANE, Assistant Examiner

U.S. Cl. X.R.

260—340.3